United States Patent [19]

Yamashita

[11] Patent Number: 5,043,638
[45] Date of Patent: Aug. 27, 1991

[54] DYNAMIC FOCUS ADJUSTING VOLTAGE GENERATING CIRCUIT

[75] Inventor: Shigeo Yamashita, Tokyo, Japan

[73] Assignee: Pioneer Electronic Corporation, Tokyo, Japan

[21] Appl. No.: 436,714

[22] Filed: Nov. 15, 1989

[30] Foreign Application Priority Data

May 22, 1989 [JP] Japan .................................. 1-128132

[51] Int. Cl.$^5$ ............................................ H01J 29/58
[52] U.S. Cl. ................................................ 315/382.1
[58] Field of Search ............................ 315/382, 382.1

[56] References Cited

U.S. PATENT DOCUMENTS

| | | | |
|---|---|---|---|
| 4,460,851 | 7/1984 | Bistline et al. ...................... | 315/408 |
| 4,587,465 | 5/1986 | Truskalo ............................. | 315/382 |
| 4,644,230 | 2/1987 | Federle .............................. | 315/382 |

Primary Examiner—Theodore M. Blum
Attorney, Agent, or Firm—Wegner, Cantor, Mueller & Player

[57] ABSTRACT

A dynamic focus adjusting voltage generating circuit for generating a dynamic focus adjusting voltage to be applied to a CRT for displaying images. The circuit includes a horizontal output circuit for supplying a sawtooth wave current to the horizontal deflection coil of the CRT, and a series circuit connected in parallel with the terminals of the horizontal output circuit and consisting of a capacitor and an inductance coil connected in series with each other. An electric potential developed at a node between the capacitance and the inductance coil is used as the dynamic focus adjusting voltage.

4 Claims, 2 Drawing Sheets

DYNAMIC FOCUS ADJUSTING VOLTAGE GENERATING CIRCUIT

BACKGROUND OF THE INVENTION

1. Field of the Invention

The present invention relates to a dynamic focus adjusting voltage generating circuit for generating a voltage for adjusting the dynamic focus of a CRT (cathode ray tube) for displaying images.

2. Description of Background Information

Conventionally, the dynamic focus adjusting voltage generating circuit is constructed as follows. From the voltage appearing at the output terminal of the horizontal output circuit, a high level dc voltage is generated and supplied to a series circuit of a transistor and resistors, so that a parabolic voltage signal having a large amplitude is generated and supplied to the focus electrode of a CRT as the dynamic focus adjusting voltage The conventional dynamic focus adjusting voltage generating circuit, however, has a drawback that the production cost is high because of the use of many parts. Moreover, there has been another drawback that the electric power consumption of the circuit is large.

OBJECT AND SUMMARY OF THE INVENTION

The objective of the present invention is therefore to provide a dynamic focus adjusting voltage generating circuit which can be constructed at relatively low cost.

In order to accomplish the above-mentioned objective, the present invention is characterized that the dynamic focus adjusting voltage generating circuit for generating a dynamic focus adjusting voltage to be applied to a CRT for displaying images includes a horizontal output circuit for supplying a sawtooth wave current to the horizontal deflection coil of the CRT, and a series circuit connected in parallel with the terminals of the horizontal output circuit and consisting of a capacitor and an inductance coil connected in series with each other, wherein an electric potential developed at a node between the capacitance and the inductance coil is used as the dynamic focus adjusting voltage.

DETAILED DESCRIPTION OF A PREFERRED EMBODIMENT

Before entering into the explanation of the embodiment of the present invention, an example of conventional dynamic focus adjusting voltage generating circuit will be described with reference to FIG. 1.

Figure 1:
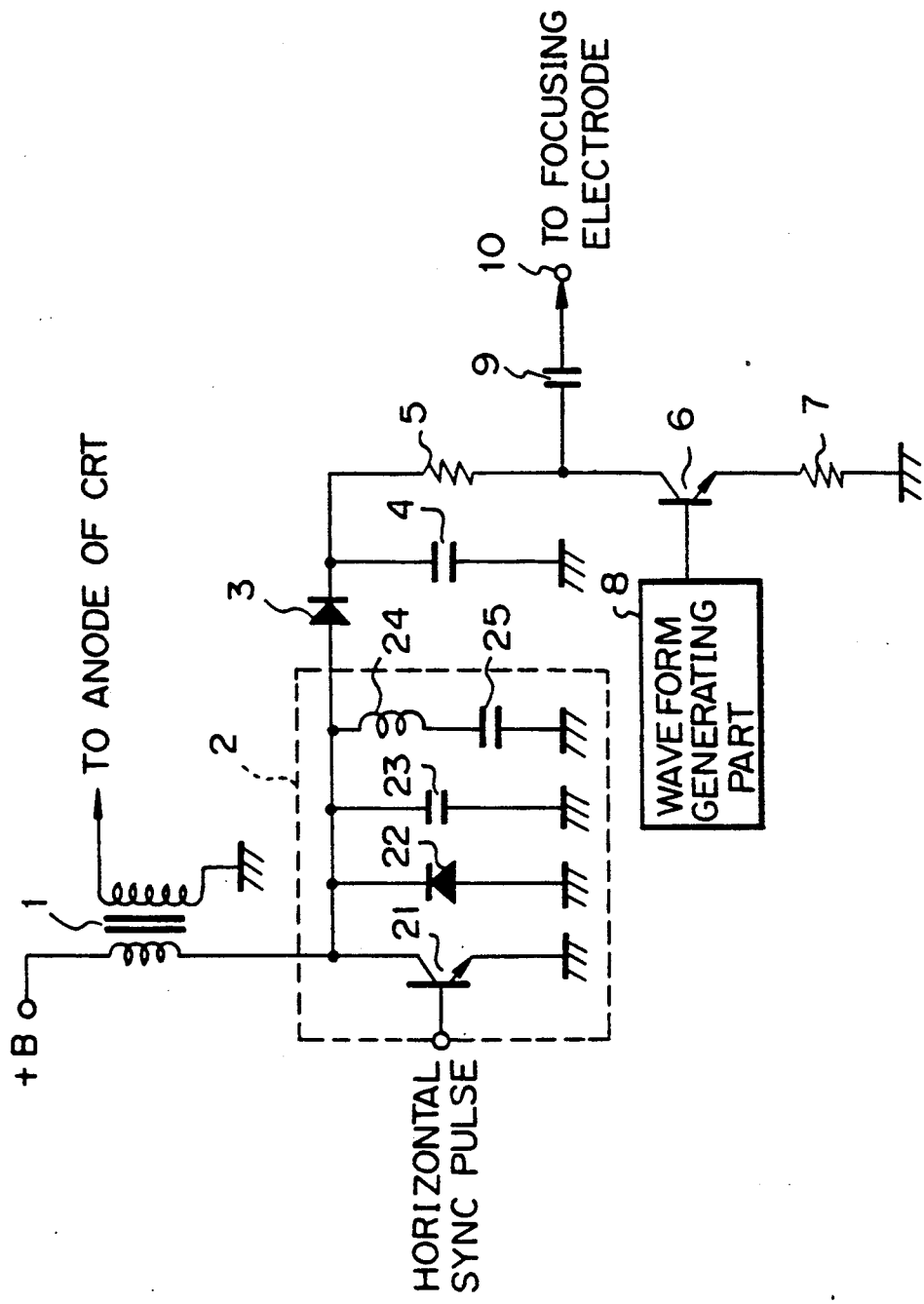
FIG. 1 is a block diagram showing an example of conventional dynamic focus adjusting voltage generating circuit.

In FIG. 1, there is shown a horizontal output circuit 2 for horizontally scanning the electron beam of a CRT (cathode ray tube, not shown) for displaying images. The horizontal output circuit 2 is made up of an output transistor 21 that turns on and off in response to the horizontal sync pulses separated from an input video signal (not shown) and applied to an input terminal of the horizontal output circuit 2, damper diode 22 a resonance capacitor, a horizontal deflection coil 24, and an S-curve characteristic correction capacitor 25. A power voltage +B of the circuit is supplied to an output terminal of the horizontal output circuit 2 through the primary winding of a flyback transformer 1 (referred to as FBT hereinafter). The other terminal of the horizontal output circuit 2 is grounded. The output at the secondary winding of the FBT 1 is supplied to the anode circuit of the CRT for displaying images.

The voltage at the output terminal of the horizontal output circuit 2 is rectified by a diode 3, and smoothed out by a capacitor 4 so that a dc voltage of 1000 V, for example, is produced.

This voltage is then supplied to a terminal of a series circuit consisting of a resistor 5, a transistor 6, and a resistor 7, which are connected in series with each other. The other terminal of the series circuit is grounded. A waveform generating circuit 8 is provided, and a parabolic voltage signal having the horizontal periodicity and synchronized with the video signal is supplied to the base of the transistor 6. The collector output of the transistor 6 therefore becomes a parabolic voltage signal having an amplitude about 600 V. This parabolic voltage signal is supplied to an output terminal 10 via a coupling capacitor. The output terminal 10 is connected to the focus electrode of the cathode ray tube for displaying images, and the parabolic voltage signal is superimposed on the bias voltage at this electrode as a dynamic focus adjusting voltage. With this arrangement, the focusing voltage is adjusted in accordance with the position of the electron beam spot in the horizontal scanning direction, so that the diameter of the beam spot is always maintained at an appropriate size in the horizontal direction of the screen.

Conventionally, the voltage for the dynamic focus adjustment has been obtained in this way. However, since the conventional circuit uses relatively many parts, the reduction of cost has been difficult as mentioned before. Moreover, there has been a drawback that the electric power consumption of the circuit is relatively large.

An embodiment of the line contour enhancing circuit according to the present invention will be explained with reference to FIGS. 2 through 3D of the accompanying drawings.

Figure 2:
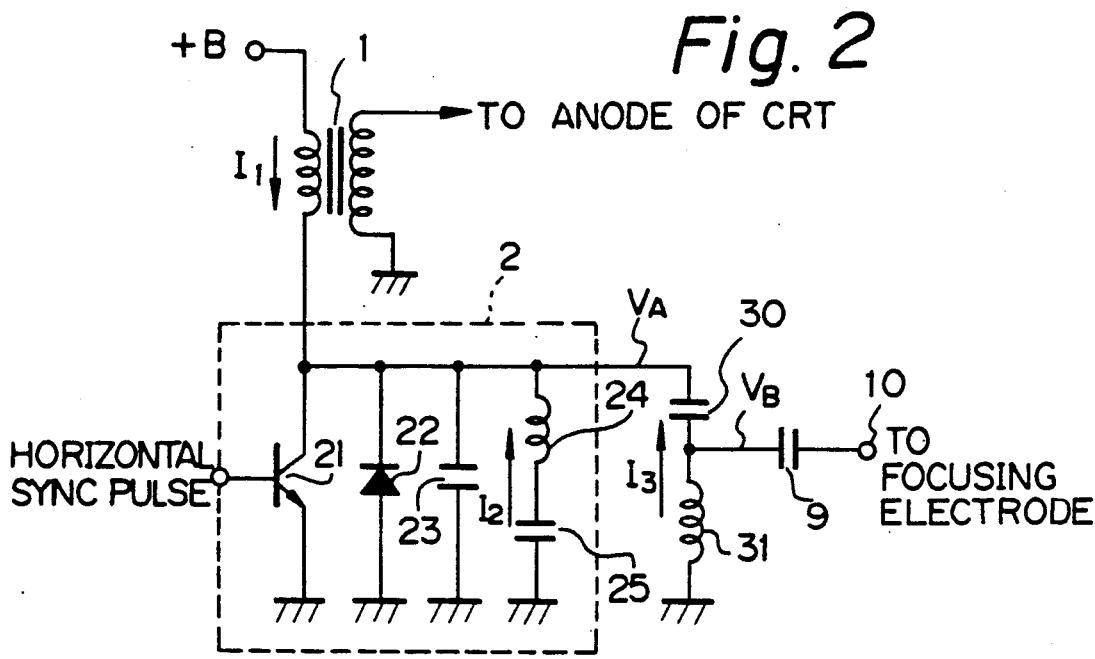
FIG. 2 is a block diagram showing an embodiment of the dynamic focus adjusting voltage generating circuit according to the present invention.

In FIG. 2, the elements and portions of the focus adjusting voltage generating circuit corresponding to those shown in FIG. 1 are designated by the same reference numerals, and the explanation thereof will not be repeated.

As shown in FIG. 2, the power voltage +B of the circuit is supplied to the output terminal of the horizontal output circuit 2 via the primary winding of the FBT 1. The other terminal of the horizontal output terminal 2 is grounded.

A series circuit consisting of a capacitor 30 and an inductance coil 31 is connected across the above mentioned terminals of the horizontal output circuit 2. A node between the capacitor 30 and the coil 31 is connected to the focus electrode of the cathode ray tube for displaying images (not shown) via a coupling capacitor 9. The other part of the circuit is the same as that of the prior art circuit shown in FIG. 1.

Figure 3A:
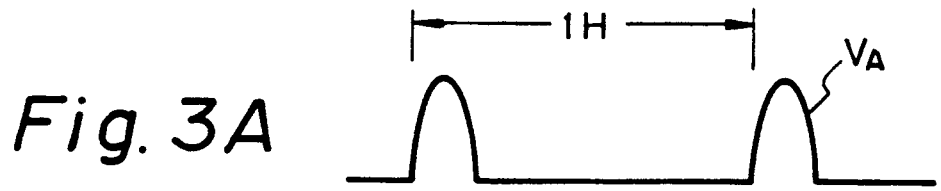
FIGS. 3A through 3D are diagrams for explaining the operation of the circuit shown in FIG. 2.
Figure 3B:
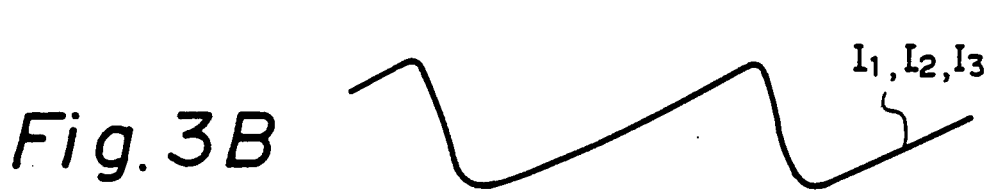
Figure 3C:
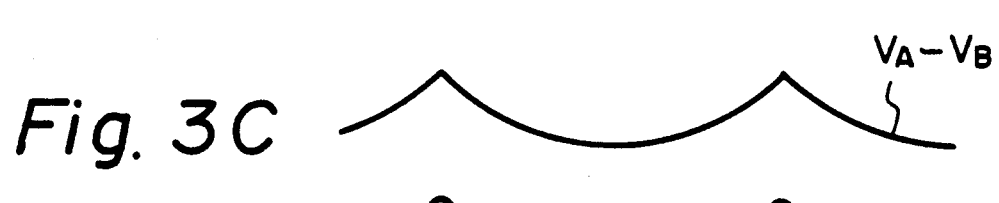
Figure 3D:
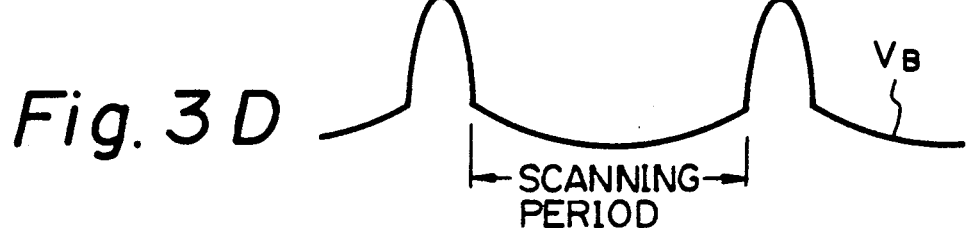

In the structure described above, when the output transistor 21 turns on and off repeatedly in response to the horizontal sync pulses, a pulse voltage $V_A$ shown in FIG. 3A develops across the terminals of the horizontal output circuit 2. By the operation of the damper diode 22, the resonance capacitor 23, the S-curve characteristic compensation capacitor 25, and the capacitor 30, sawtooth currents $I_1$, $I_2$, and $I_3$ having a waveform shown in FIG. 3B flow through the primary winding of the FBT 1, the horizontal deflection coil 24, and the coil 31 respectively. As the sawtooth current $I_3$ flow through the capacitor 30, the voltage across the terminals thereof becomes a parabolic wave voltage having an amplitude about 600 V as shown in FIG. 3C. Therefore, the voltage $V_B$ at the node between the capacitor 30 and the coil 31 becomes as illustrated in FIG. 3D, where the voltage shows a parabolic waveform in each scanning period. This variation in voltage is supplied to the output terminal 10 through the coupling capacitor 9 as the dynamic focus adjusting voltage.

As specifically described above, in the case of the dynamic focusing adjusting voltage generating circuit according to the present invention the circuit is structured such that a sawtooth waveform current is generated across an LC resonance circuit connected in parallel with the horizontal output circuit by using the switching operation of the horizontal transistor. Furthermore, the parabolic wave voltage for adjusting operation is derived at the capacitor of the LC resonance circuit by this sawtooth waveform current. Thus the focus adjusting voltage generating circuit according to the present invention has a simple structure using only a few parts, and the circuit can be produced at low cost. Furthermore, there is another advantage that the electric power consumption of the circuit is very small because the circuit includes no resistor.

What is claimed is:

1. A dynamic focus adjusting voltage generating circuit for generating a dynamic focus adjusting voltage for application to a cathode ray tube, the circuit comprising:

horizontal output circuit means for supplying a sawtooth wave current to a horizontal deflection coil of said cathode ray tube and having an input terminal, an output terminal, and a ground terminal, said horizontal output circuit means comprising an S-shaping capacitor and a horizontal deflection coil connected in series with each other; and a series circuit connected across said output terminal and said ground terminal of said horizontal output circuit and consisting of a capacitor and an inductance coil connected in series with each other, wherein an electric potential developed at a node between said capacitor and said inductance coil is used as the dynamic focus adjusting voltage.

2. A dynamic focus adjusting voltage generating circuit as claimed in claim 1, wherein said capacitor is connected to said output terminal and said inductance coil is connected to said ground terminal.

3. A dynamic focus adjusting voltage generating circuit as claimed in claim 1, wherein said node between said capacitor and said inductance coil is connected to a focus grid of the cathode ray tube via a coupling capacitor.

4. A dynamic focus adjusting voltage generating circuit for generating a dynamic focus adjusting voltage for application to a cathode ray tube, the circuit comprising:

horizontal output circuit means for supplying a sawtooth wave current to a horizontal deflection coil of said cathode ray tube and having an input terminal, an output terminal, and a ground terminal; and a series circuit connected across said output terminal and said ground terminal of said horizontal output circuit and consisting of a capacitor and an inductance coil connected in series with each other, wherein an electric potential developed at a node between said capacitor and said inductance coil is used as the dynamic focus adjusting voltage;

wherein said capacitor is connected to said output terminal and said inductance coil is connected to said ground terminal.

* * * * *